Figure 7:
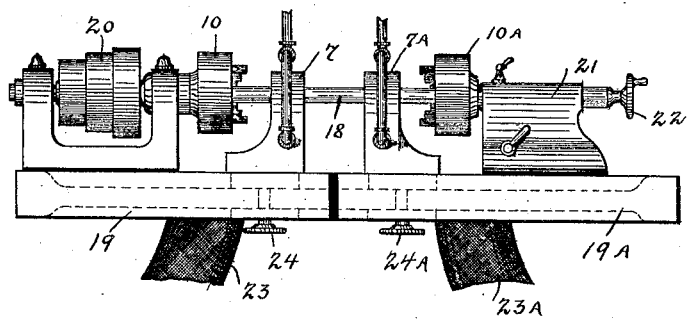

(No Model.) 2 Sheets—Sheet 1.
H. LEMP.
ELECTRIC WELDING APPARATUS.
No. 443,224. Patented Dec. 23, 1890.
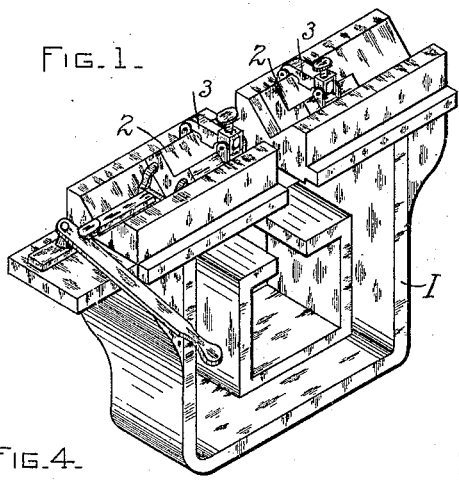
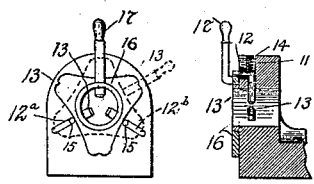 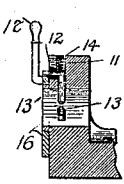 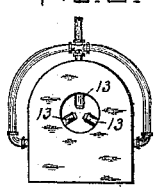 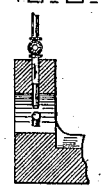
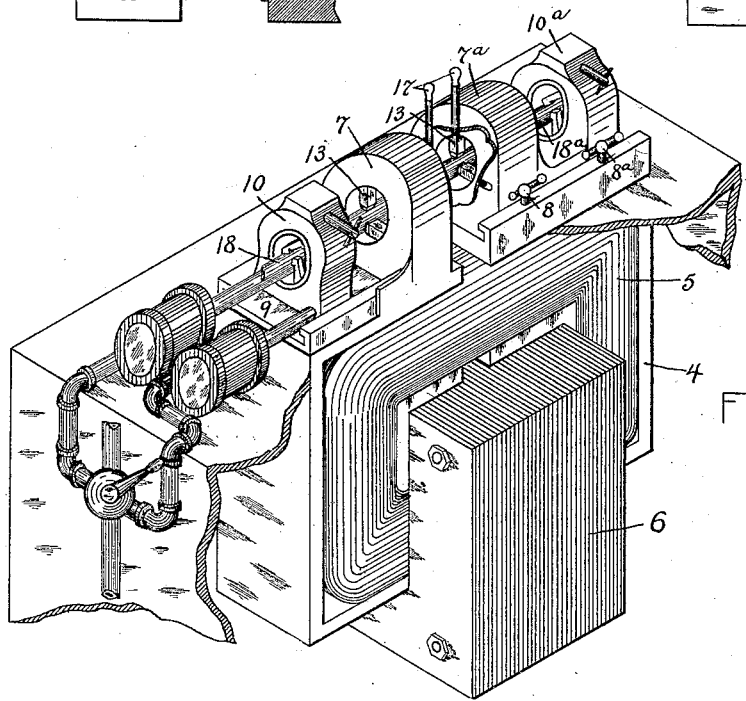
WITNESSES
INVENTOR
Hermann Lemp
By H. C. Townsend
Atty.

(No Model.)  2 Sheets—Sheet 2.

H. LEMP.
ELECTRIC WELDING APPARATUS.

No. 443,224. Patented Dec. 23, 1890.

WITNESSES
Thos. F. Courey.
Wm. H. Capel

INVENTOR
Hermann Lemp
By H. C. Townsend
Atty.

THE NORRIS PETERS CO., PHOTO-LITHO., WASHINGTON, D. C.

UNITED STATES PATENT OFFICE.

HERMANN LEMP, OF LYNN, MASSACHUSETTS, ASSIGNOR TO THE THOMSON ELECTRIC WELDING COMPANY, OF MAINE.

ELECTRIC WELDING APPARATUS.

SPECIFICATION forming part of Letters Patent No. 443,224, dated December 23, 1890.

Application filed August 6, 1890. Serial No. 361,162. (No model.)

*To all whom it may concern:*

Be it known that I, HERMANN LEMP, a citizen of the United States, and a resident of Lynn, in the county of Essex and State of Massachusetts, have invented certain new and useful Electric Welding Apparatus, of which the following is a specification.

My present invention relates to the construction of that class of electric metal-working apparatus in which the work is heated by the passage of an electric current and movement is given to the work while heated in the welding, upsetting, or other operation.

The general form and operation of the machines used in electric welding, brazing, forging, upsetting, &c., are fully described in and will be readily understood from various patents granted to Elihu Thomson on this subject, and it will therefore be unnecessary to explain the process or that apparatus; but in order to show more clearly the advantages of my construction I refer briefly to particular parts of the machine as used in the operation of welding. It is well known that this process of welding is generally a butt-welding one, although it is not by any means confined to that, and that longitudinal pressure is applied to the metals to force the abutting ends together at the time when the current has caused the metal to become very hot and near or quite at the fusion-point. In most cases this pressure is applied while the current is still flowing. Consequently it is necessary to have some means of carrying the current to the metal at the same time that it is moving. Heretofore this has been done by providing two parts with smooth polished surfaces, one sliding on the other, the metal to be worked being clamped upon the sliding one and a connection made between the other and the source of current. This necessitated very fine mechanical construction of the surfaces in order to lessen the resistance at that point and avoid loss of power during the flow of heavy currents. In working with heavy metals or large masses of metals too fine construction is incompatible with the rough usage that such a machine receives, and in time the parts become worn and bent out of shape, so that new fittings are required. Although in my new construction I do not lessen the number of contacts through which the current flows, I avoid two important objections—namely, the nice and careful construction of sliding contacts and the necessity of making the current-carrying devices of heavy construction in order to stand the wear and tear of usage.

A noticeable difference between the style of clamps heretofore used and my construction is in the relation between the current-carrying devices and the clamps for holding the bars, rods, &c., while under longitudinal pressure, and also in the relation of the metals worked upon to the current devices. In the old style of welder the pressure was applied to the end of the slide before mentioned, thus making it serve both as current-clamp and pressure-clamp.

In my present invention, instead of securing the stock to copper blocks or pieces sliding upon other blocks, I slide the stock itself past suitable current-carrying electrodes or contacts bearing on the stock and which remain stationary, and provide independent mechanical jaws or clamps which grasp the stock and serve to hold it, so that end pressure may be applied. By this arrangement the current-carrying clamps need be only large enough to carry the current without heating. While I prefer to use separate mechanical jaws or clamps for holding the stock in place in the operation of applying end pressure, it would be within my invention to move the stock past the current-carrying clamps or electrodes by any means, as by hand.

The great advantage in the use of such devices as are herein mentioned is that the wear and tear is principally upon parts which are easily and cheaply replaced and not upon surfaces which are not only difficult to make, but which must be kept in perfect condition in order to work to the best advantage; also, the liability of the several parts to heat and warp is greatly reduced, as is also the cost of construction and maintenance.

Figure 8:
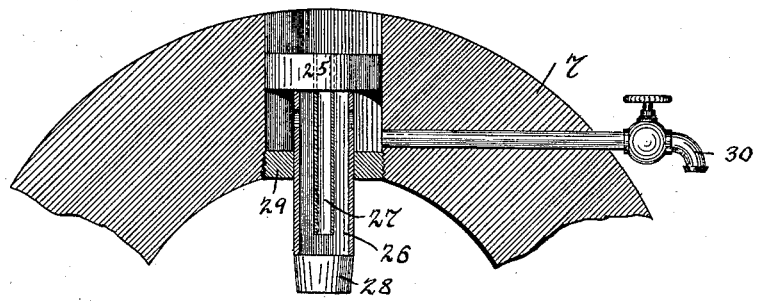
Figure 9:
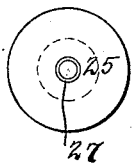
Figure 10:
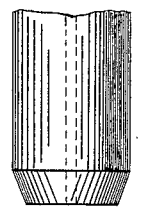

In the accompanying drawings, Figure 1 illustrates a type of machine formerly employed. Fig. 2 shows in perspective a form of machine embodying my present invention. Figs. 3, 4, 5, and 6 are details of construction of the clamp and current-carrying electrodes bearing on the work. Fig. 7 is a side elevation of another form of electric metal-working apparatus wherein a rubbing or sliding contact between the work and current bearing or carrying electrodes in direct contact therewith is provided for in the operation of rotating the work while included in the electric circuit. Fig. 8 is a cross-section through one of the uprights bearing the electrode or plunger which bears upon the work. Fig. 9 is an end view of the plunger. Fig. 10 is a side elevation of a plunger in which provision for water circulation is made in a modified way.

In Fig. 1 1 is the secondary of an alternating-current transformer. It is formed as a copper casting with a groove in it to hold the primary coil, the iron core passing through the opening in the center. This arrangement of the three parts is illustrated in Fig. 2. Referring to Fig. 1, 2 is a V-block, in which the bar or rod constituting the work is securely held by the gripping device 3. A rod connects the lever with the V-block, and this provides the means for longitudinal pressure. This clearly illustrates how the current is collected from the secondary and given to the stock, and also shows how easy it is for the V in the secondary to become dirty or coated with grit, which impairs the contact and causes heating when the large currents flow which are used in the work.

Referring now to Fig. 2, 4 is the secondary, 5 the primary, and 6 the iron core, of a transformer. 7 is an upright projection on a terminal of the secondary, and which is preferably an integral part of the casting which forms the secondary. $7^a$ is a copper casting of the same form and dimensions as 7, but is capable of being slid on the casting and fastened in any position by means of the screws 8 and $8^a$. The object of making this movable is to get variations of projection of the stock beyond 7 and $7^a$, according to the diameter of the bar welded, a feature indispensable with good results in welding by electricity; otherwise this part might be stationary, and is so during the welding operation. 9 is a steel plate with side guides, which is fastened to but insulated from 4. 10 is an ordinary centering-chuck, which slides on the plate and in the guides and grasps the work. Any other device might be used for grasping or clamping the work to give it end movement. $10^1$ is another centering-chuck, which is insulated from $7^a$, but is secured to that casting, so as to move with it when required. It will be noticed that the difference between the right and left sides is this, that 10 may change its position with regard to 7, which is stationary, and that $10^a$ does not change its position with regard to $7^a$, but is moved with it. It is to be understood that I do not limit myself to this precise mechanical construction, as in some cases it is desirable to move both chucks toward each other at once, in which case both sides would be alike, and it may be found convenient to use an entirely different form of mechanical chuck.

The construction of the part 7 and $7^a$ is illustrated in the other figures. From the inside surface of the round hole in these parts and extending radially outward are made three holes equidistant apart, or in other cases more or less than three may be required, and I do not limit myself to any special number. One of these is shown at 11 in Fig. 4. Extending the length of these holes and leading into them from the face of the casting are slots $12^a$ and $12^b$, Fig. 3. Fitting into the hole 11 is a copper rod 13, backed by a spring 14, which tends to force the rod toward the center of the large hole, so as to bear upon and make electrical connection with the work, as bar 18 or $18^a$. Steel pin 15 is put through the slot 12 and screwed into the piece 13, allowing the latter to be moved upward by any external means. 16 is a cam rotated by the handle 17 on a collar surrounding the large hole, and serves to move all three pieces 13 13 13 upward by bearing against the steel pins until these pins rest on the projections of the cam, holding the rods 13 in a position farthest away from the center. This position is shown by the dotted lines. When the handle is moved to the position shown by the full lines, the springs force the rods toward the center to the position shown by the full lines, Fig. 3. Another means of accomplishing the same end is illustrated in Figs. 5 and 6. In this instance the holes containing the rods 13 are connected from the outside to a source of pneumatic or hydraulic pressure, which may be made to force the three pieces toward the center or upon removal of the pressure to allow the rods to move back, each rod acting as a piston would.

The operation of the machine is as follows:

Referring again to Fig. 2, if two bars are to be welded, I start first with the contact-pieces or current-bearing electrodes 13 moved outward and jaws of the mechanical chucks apart, and then push the bars 18 and $18^a$ through until their ends abut against each other half-way between the parts 7 and $7^a$, when the jaws are closed tightly upon the bars. The handles 17 and $17^a$ are now moved to allow the rods 13 to come down on the bars and make contact with them. As the mechanical chuck is insulated from the secondary of the transformer, it is evident that the entire contact for the flow of current is made by these three pieces, which bear down rather hard by reason of the pressure behind them. As the current heats and softens the abutting ends, the rods are forced together by means of any mechanical pressure, as by pressure acting on pistons, the bar 18 sliding on the three contact-rods 13. The noticeable difference between this action and the one illustrated in Fig. 1 is that the distance between the contacts representing opposite polarity remains the same in the former, while in the latter it decreases as the longitudinal pressure forces the bar together; but the principal advantage to be observed is that there are no sliding surfaces which must be kept in perfect order free from dirt or grease, &c. The contact-pieces used are so simple and cheap that they may be easily replaced when worn out. Also, by using a number of contacts arranged in a circle or around the stock I obtain a better distribution of the current, especially on large work.

In operations, especially upsetting and subsequent forging or shaping, it is desirable to rotate the metal bar or rod in order to apply dies or proper cutters. In Fig. 7 is shown the application of my invention to an apparatus suitable for this purpose. 19 represents the bed or base of a lathe, which is made in two parts insulated from one another. The usual cone-pulley 20 and chuck 10 are insulated from the base, as is also the tail-stock. This tail-piece 21 carries a chuck 10$^a$, which is rotatably mounted, and may revolve when a bar or rod, as 18, is held by the two chucks and power applied to pulley 20. The uprights 7 and 7$^a$ are the same in construction as in Fig. 2, and are electrically connected with a source of current of large volume. This may be done by connecting cables 23 and 23$^a$ to the two insulated parts of the base of the lathe and mounting the uprights upon the base, as shown, allowing them freedom of movement, for the same reason as in Fig. 2. For this purpose the screws 24 and 24$^a$ are provided to clamp the uprights when in the proper position. The screw 22 provides end pressure for a welding or upsetting operation. In such an apparatus the contact-pieces contained in the uprights 7 and 7$^a$ bear upon and make contact with the bar in the same manner as shown in Fig. 2. The friction of the rotating bar will add to the heat caused by the large amount of current flowing from contact to bar, and therefore I apply a cooling-fluid to the contacts in accordance with a patent granted to Elihu Thomson, No. 347,142, and as shown in Fig. 8. 7 represents part of one of the uprights, as shown in Fig. 5. The contact-piece is made of two concentric tubes 26 and 27, the outer one forming a hollow stem or support terminating in a contact-block 28. The inner tube passes through the piston 25, (see also Fig. 9,) leaving a small passage from the top of the cylinder to the bottom by means of the two tubes, all as shown. A plug 29 closes the lower part of the cylinder after the contact and piston are in place, and an outlet 30 communicates with that end of the chamber.

When hydraulic pressure is admitted to push the contact downward, as before explained in connection with Fig. 5, a certain amount of water escapes through tube 27, dashes against the end 28, and passes out through tube 26, the holes through the bottom, and outlet 30. This keeps the contacts cool. Another method is to drill a small hole through the whole length of a solid contact-piece, like that shown by 13, Fig. 5, and let a small amount of water flow out the end and onto the bar. Such a contact-piece is shown in Fig. 10, the dotted lines representing a small passage through the center. This latter is in accordance with an application made by me and filed in the Patent Office May 31, 1890, Serial No. 353,809.

I do not limit myself to the particular forms of machine shown and described, as I may use various mechanical variations in the details of the mechanism without departing from the spirit of my invention.

I am aware that welding-machines have been made and patented in which solid mechanical construction was used to take any strain from the electrical devices made separate from the same; but these involve either flexible connections, which are not practical in heavy work, or separate sliding contacts, which it is the purpose of my invention to avoid.

What I claim as my invention is—

1. In an electric metal-working apparatus, fixed current-bearing electrodes making contact with the work and through or by which the work slides in the welding, upsetting, or other operation, as and for the purpose described.

2. In an electric metal-working apparatus, plungers or current-carrying electrodes working in lines converging upon the work, and means for moving the work between said plungers at right angles to the line in which said plungers move.

3. The combination, in an electric metal-working apparatus, of a current clamp or electrode bearing on the work, and a mechanical clamp for grasping the work and moving it by the current-clamp, as and for the purpose described.

4. The combination, in an electric metal-working apparatus, of current-carrying slides or plungers bearing laterally on the work and mounted on a fixed support, and a centering-chuck mounted on a longitudinally-movable slide, as and for the purpose described.

5. In an electric metal-working apparatus, the combination, with a contact plunger or rod adapted to move laterally toward the work, of a spring for forcing the same against the work and a cam-plate for disengaging it, as and for the purpose described.

6. In an electric metal-working apparatus, the combination, with two or more current-carrying electrodes working in transverse lines to engage and disengage the work, of a cam-plate for moving said plungers outward away from the work, as and for the purpose described.

7. In an electric metal-working apparatus, the combination, with the secondary for the transformer, of a block 7 at the terminal thereof, and a series of plungers 13, mounted therein and bearing laterally upon the work, as and for the purpose described.

8. In an electric metal-working apparatus, the combination, with the block or bearing 7, of the plungers 13, working in the same, springs 14 for pressing the same inward, and a cam-plate 16, engaging with pins projecting from said plungers, as and for the purpose described.

9. In an electric metal-working apparatus, the combination, with the current-carrying electrodes bearing on the same and adapted to make rubbing or sliding contact therewith, of means for rotating the work in contact with such electrodes, as and for the purpose described.

10. In an electric metal-working apparatus, the combination, substantially as described, of a number of current-carrying electrodes consisting of reciprocating plungers operating in lines converging upon the work and adapted to make sliding contact, and means for rotating the work while the plungers make rubbing or sliding contact therewith.

11. The combination, substantially as described, in an electric metal-working apparatus, of two rotary chucks or holders and two sets of current-carrying electrodes mounted between said chucks or holders and adapted to make sliding or rubbing contact with the work when rotated, as and for the purpose described.

12. The combination, substantially as described, of two rotary chucks or holders, means for imparting endwise movement to one of the same, and current-carrying electrodes mounted between the chucks or holders and adapted to make sliding contact with the work when the same is moved longitudinally or is rotated.

13. In an electric metal-working apparatus, the combination, substantially as described, of two rotary chucks or holders, means for imparting endwise movement to one of said chucks, and current-carrying electrodes mounted between said chuck and the part of the work to be heated and adapted to make rubbing or sliding contact with the work when it is given an end movement or is rotated.

14. The combination, in an electric metal-working apparatus, of a reciprocating contact adapted to engage the work laterally and having a solid contact end, and a pipe or passage for delivering the cooling-fluid against the inner side of the contact end, as and for the purpose described.

15. The combination, in an electric metal-working apparatus, of an electric contact, a piston for forcing the same against the work, a hollow stem or support extending from the piston and carrying said contact, a passage from the rear of the piston, whereby a cooling-fluid employed in operating the piston may be brought to bear upon the contact, and pipes or passages for withdrawing the fluid from the hollow stem or support.

Signed at Lynn, in the county of Essex and State of Massachusetts, this 1st day of August, A. D. 1890.

HERMANN LEMP.

Witnesses:
JOHN W. GIBBONY,
DUGALD MCKILLOP.